No. 740,996. PATENTED OCT. 6, 1903.
O. TVERDAHL.
SAD IRON.
APPLICATION FILED JAN. 2, 1903.
NO MODEL.
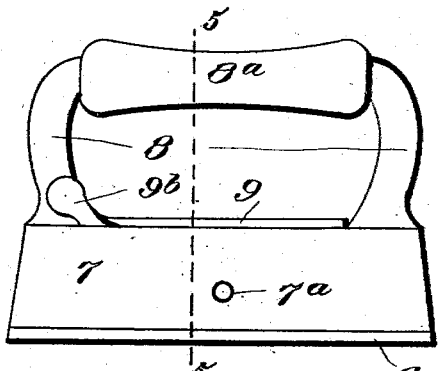
Fig. 1.
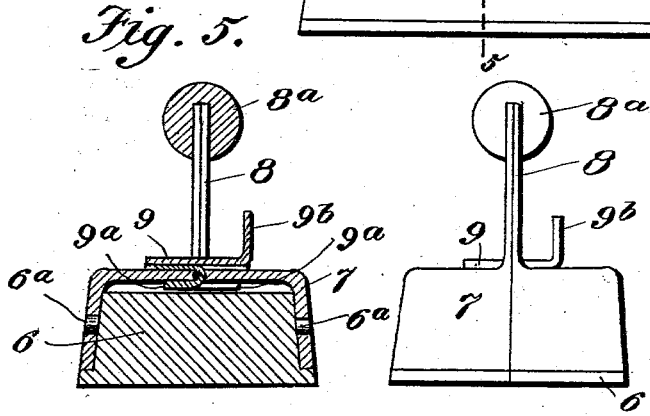
Fig. 5.
Fig. 2.
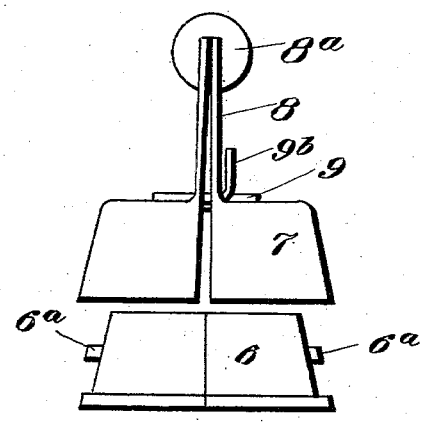
Fig. 3.
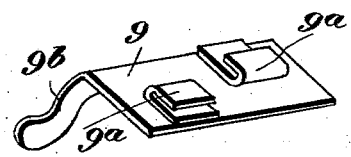
Fig. 4.
Witnesses
M. J. Corder
Geo. E. Tew
Inventor
Ole Tverdahl
by Milo B. Stevens & Co.
Attorneys No. 740,996. Patented October 6, 1903.

UNITED STATES PATENT OFFICE.

OLE TVERDAHL, OF CANAL DOVER, OHIO, ASSIGNOR OF ONE-EIGHTH TO L. M. DOWNS, OF CANAL DOVER, OHIO.

SAD-IRON.

SPECIFICATION forming part of Letters Patent No. 740,996, dated October 6, 1903.

Application filed January 2, 1903. Serial No. 137,517. (No model.)

*To all whom it may concern:*

Be it known that I, OLE TVERDAHL, a citizen of the United States, residing at Canal Dover, in the county of Tuscarawas and State of Ohio, have invented certain new and useful Improvements in Sad-Irons; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to sad-irons; and the object thereof is to form an improved detachable handle for engaging the heater block or body of the iron.

Generally speaking, the invention comprises a heater block and a combined split cover and handle which springs open or yields to receive the block therein and which may be sprung open by a finger-lever to drop the same.

In the accompanying drawings, Figure 1 is a side elevation of the iron. Fig. 2 is an end elevation. Fig. 3 is an end elevation showing the parts separated and the cover sprung open. Fig. 4 is a perspective view showing the under side of the finger-lever removed from the cover. Fig. 5 is a section on the line 5 5 of Fig. 1.

Referring specifically to the drawings, 6 indicates the heater block or body of the iron, having the usual smooth bottom surface for ironing. This body has lugs $6^a$ on each side thereof which when the cover is in place enter holes $7^a$ in each side of the cover 7, and thereby fasten the cover and block together. The cover is made of proper shape to fit over and inclose the top and sides of the heater-block and is split longitudinally and centrally from front to rear points, forming two separate halves. The standards 8 of the handle are also split, each standard being formed in two parts, each of which is attached to one part or half of the cover. These parts of the handle are formed of flattened spring metal and normally tend to bring the halves of the cover together. The parts of the handle-standards are joined above to receive the wooden handpiece $8^a$.

The lever to open the cover by separating its parts comprises a plate 9, fitting between the standards of the handle, having two flanges $9^a$ on the under side thereof. These flanges project downwardly through the joint between the halves of the cover and are curved or formed into oppositely-disposed clasps embracing, respectively, the opposite parts of the top plate of the cover. The lever-plate has a thumb-piece $9^b$ projecting from one end thereof in convenient position to be pressed sidewise by the thumb of a hand clasping the handle. When so pressed sidewise, the effect is to turn the lever, as indicated in Fig. 3, and the flanges engage the opposite parts of the cover to spread the same apart a sufficient distance to release the lugs $6^a$ from the holes $7^a$, when the cover may be lifted off the block. When attaching the cover to the block, it is only necessary to press the cover down over the block with sufficient force to cause the sides to spread and snap over the lugs, which action is facilitated by the inclined form of the sides of the iron.

The cover and metallic handle parts may be made of any suitable material and in any desired manner within the scope of my invention; but in the practical manufacture of the same the said parts are preferably all formed of one piece of sheet metal—that is, the halves of the cover and the metal parts of the handle are formed by being cut and shaped from a single sheet of metal, the halves being joined at the top of the standards, and after stamping are folded together upon each other to form the complete device, excepting the thumb-lever, which is made separately.

What I claim as new, and desire to secure by Letters Patent, is—

In a sad-iron, the combination with a heater-block having lugs projecting from the sides thereof, of a cover formed in two parts yieldingly held together inclosing the block and having holes to receive the lugs, a handle attached to the cover, and means to spread the parts of the cover laterally beyond the lugs, to disengage the same.

In testimony whereof I do affix my signature in presence of two witnesses.

OLE TVERDAHL.

Witnesses:
L. M. DOWNS,
EDW. TVERDAHL.